United States Patent
Arner et al.

(10) Patent No.: US 9,506,597 B2
(45) Date of Patent: Nov. 29, 2016

(54) SUPPORT SYSTEM FOR AN AFTERTREATMENT SYSTEM FOR AN ENGINE

(71) Applicant: General Electric Company, Schenectady, NY (US)

(72) Inventors: James Edward Arner, Newport News, VA (US); Paul Lloyd Flynn, Lawrence Park, PA (US); Shishir Tiwari, Erie, PA (US); Shashi Kiran, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 139 days.

(21) Appl. No.: 14/153,539

(22) Filed: Jan. 13, 2014

(65) Prior Publication Data
US 2015/0069207 A1   Mar. 12, 2015

Related U.S. Application Data

(60) Provisional application No. 61/875,261, filed on Sep. 9, 2013.

(51) Int. Cl.
| F16M 13/00 | (2006.01) |
| F16M 7/00 | (2006.01) |
| F16M 5/00 | (2006.01) |
| F01N 13/18 | (2010.01) |
| F01N 13/00 | (2010.01) |

(52) U.S. Cl.
CPC .............. *F16M 7/00* (2013.01); *F01N 13/017* (2014.06); *F01N 13/1822* (2013.01); *F16M 5/00* (2013.01); *F01N 2590/08* (2013.01); *F01N 2590/10* (2013.01); *F16M 2200/08* (2013.01)

(58) Field of Classification Search
USPC ....... 248/560, 576, 577, 581, 637, 638, 640, 248/676, 677, 678; 60/323
See application file for complete search history.

(56) References Cited

U.S. PATENT DOCUMENTS

| 5,035,397 | A | * | 7/1991 | Yamada | ............... | B60K 5/1216 180/297 |
| 5,064,144 | A | * | 11/1991 | Chee | ..................... | B64D 27/20 244/54 |
| 8,820,691 | B2 | * | 9/2014 | Bednarz | .............. | F01N 13/1822 123/65 A |
| 2005/0218288 | A1 | * | 10/2005 | Allen | ...................... | F02B 63/04 248/637 |
| 2009/0072116 | A1 | * | 3/2009 | Fielding | ................... | F16M 5/00 248/638 |
| 2010/0269494 | A1 | * | 10/2010 | Saito | ..................... | E02F 9/0883 60/311 |
| 2011/0023472 | A1 | * | 2/2011 | Saito | ..................... | F01N 3/0335 60/311 |
| 2011/0030353 | A1 | * | 2/2011 | Kamiya | ............. | B01D 46/0063 60/297 |
| 2011/0154809 | A1 | * | 6/2011 | Mitsuda | ................... | E02F 9/00 60/311 |
| 2012/0167558 | A1 | | 7/2012 | Svihla | | |
| 2013/0008528 | A1 | * | 1/2013 | Mitsuda | ................ | F01N 3/0211 137/343 |
| 2014/0208727 | A1 | * | 7/2014 | Hayman | ................. | F01N 13/06 60/323 |
| 2015/0240698 | A1 | * | 8/2015 | Nishimura | .......... | F01N 13/1805 60/278 |

FOREIGN PATENT DOCUMENTS

WO   2011087819 A2   7/2011

* cited by examiner

*Primary Examiner* — Steven Marsh
(74) *Attorney, Agent, or Firm* — John A. Kramer; Global Patent Operation

(57) ABSTRACT

Various systems are provided for a support structure. In one embodiment, a system comprises a support structure including a plurality of support legs, a first end of each support leg of the plurality of support legs coupled to a respective cylinder head of a plurality of cylinder heads mountable to an engine block, the plurality of support legs configurable to support an exhaust aftertreatment system.

19 Claims, 8 Drawing Sheets

SUPPORT SYSTEM FOR AN AFTERTREATMENT SYSTEM FOR AN ENGINE

CROSS-REFERENCE TO RELATED APPLICATIONS

This application claims priority to U.S. provisional application No. 61/875,261, filed Sep. 9, 2013, hereby incorporated by reference.

FIELD

Embodiments of the subject matter disclosed herein relate to an engine, engine components, and an engine system, for example.

BACKGROUND

Engines may utilize an exhaust aftertreatment system to reduce regulated emissions. In some examples, the exhaust aftertreatment system may be suspended above the engine with a support structure mounted to a main frame, or block, of the engine. However, mounting the support structure to the engine main frame may provide a limited number of mounting points along a length of the engine, due to interference with other engine systems. As a result, exhaust aftertreatment support structures may be bulky or provide less support. Further, maintenance of a head of the engine may require removal of the entire support structure and aftertreatment system.

BRIEF DESCRIPTION

In one embodiment, a system comprises a support structure including a plurality of support legs, a first end of each support leg of the plurality of support legs coupled to a respective cylinder head of a plurality of cylinder heads mountable to an engine block, the plurality of support legs configurable to support an exhaust aftertreatment system.

In this way, multiple support legs are mounted to respective cylinder heads along a length of the engine block. This mounting structure may increase a number of mounting points for the support structure to the engine, thereby providing distributed support along a length of the aftertreatment system. Further, each leg of the support structure may be individually removable from a respective cylinder head and the rest of the support structure. Individually removing support legs may allow for servicing of the engine head and/or specific cylinder heads of the engine head without removing the entire support structure and aftertreatment system.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of a support structure. The support structure includes a first platform and a second platform positioned opposite one another with respect to a centerline of the support structure. Additionally, each of the first platform and the second platform are angled away from the centerline. The support structure further includes a first set of support legs and a second set of support legs. Each support leg of the first set of support legs is coupled between the first platform and a first side of a mounting surface. Similarly, each support leg of the second set of support legs is coupled between the second platform and a second side of the mounting surface. Further still, the support structure includes a first set of coil isolators coupled to the first platform and a second set of coil isolators coupled to the second platform. The first set of coil isolators and the second set of coil isolators are configurable to receive a load. The support structure then supports the load above the mounting surface.

In one embodiment, the support structure may be installed in an engine system. As such, the support structure may support and suspend an exhaust aftertreatment system above an engine of the engine system. The engine may be a V-engine wherein the first set of support legs are mounted to respective cylinder heads on a first bank of the V-engine and the second set of support legs are mounted to respective cylinder heads on a second bank of the V-engine. In this embodiment, the centerline of the support structure is also the centerline of the V-engine. Each support leg may be individually removable from its respective cylinder head, thereby allowing for maintenance of the cylinder head without removing the entire support structure and aftertreatment system.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Figure 1:
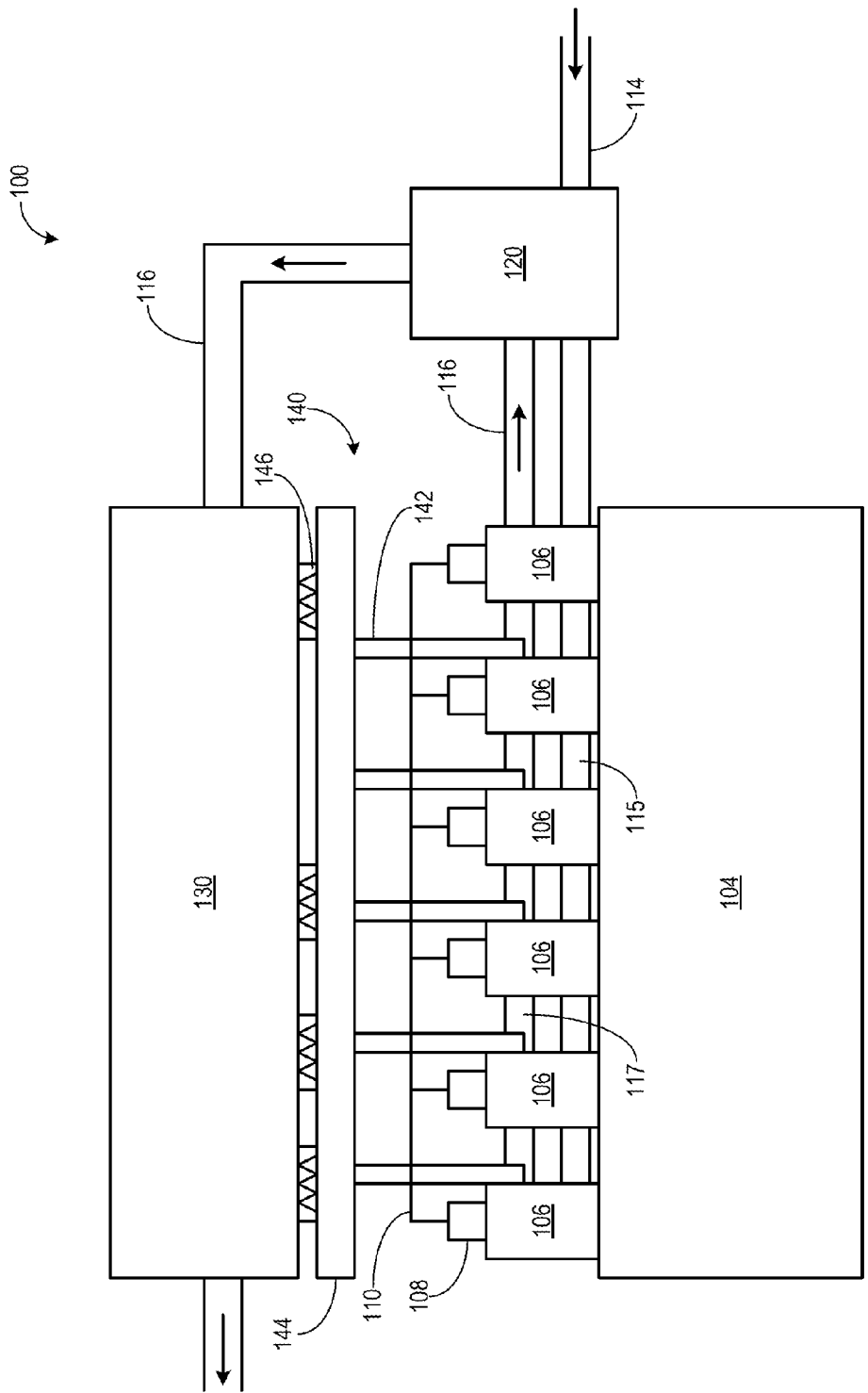
FIG. 1 shows an engine system including an exhaust gas aftertreatment system according to an embodiment of the invention.

Before further discussion of the support structure, an exemplary embodiment of an engine system is disclosed in which the support structure for an exhaust gas aftertreatment system of the engine system may be used. For example, FIG. 1 shows an engine system 100 with an engine 104. The engine 104 receives intake air for combustion from an intake passage 114. The intake may be any suitable conduit or conduits through which gases flow to enter the engine. For example, the intake may include an intake manifold 115, the intake passage 114, and the like. The intake passage 114 receives ambient air from an air filter (not shown) that filters air from outside of the engine 104. Exhaust gas resulting from combustion in the engine 104 is supplied to an exhaust, such as exhaust passage 116. The exhaust, or exhaust passage 116, may be any suitable conduit through which gases flow from the engine. For example, the exhaust may include an exhaust manifold 117, an exhaust passage 116, and the like. Exhaust gas flows through the exhaust passage 116 and out of the engine system 100. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

Figure 3:
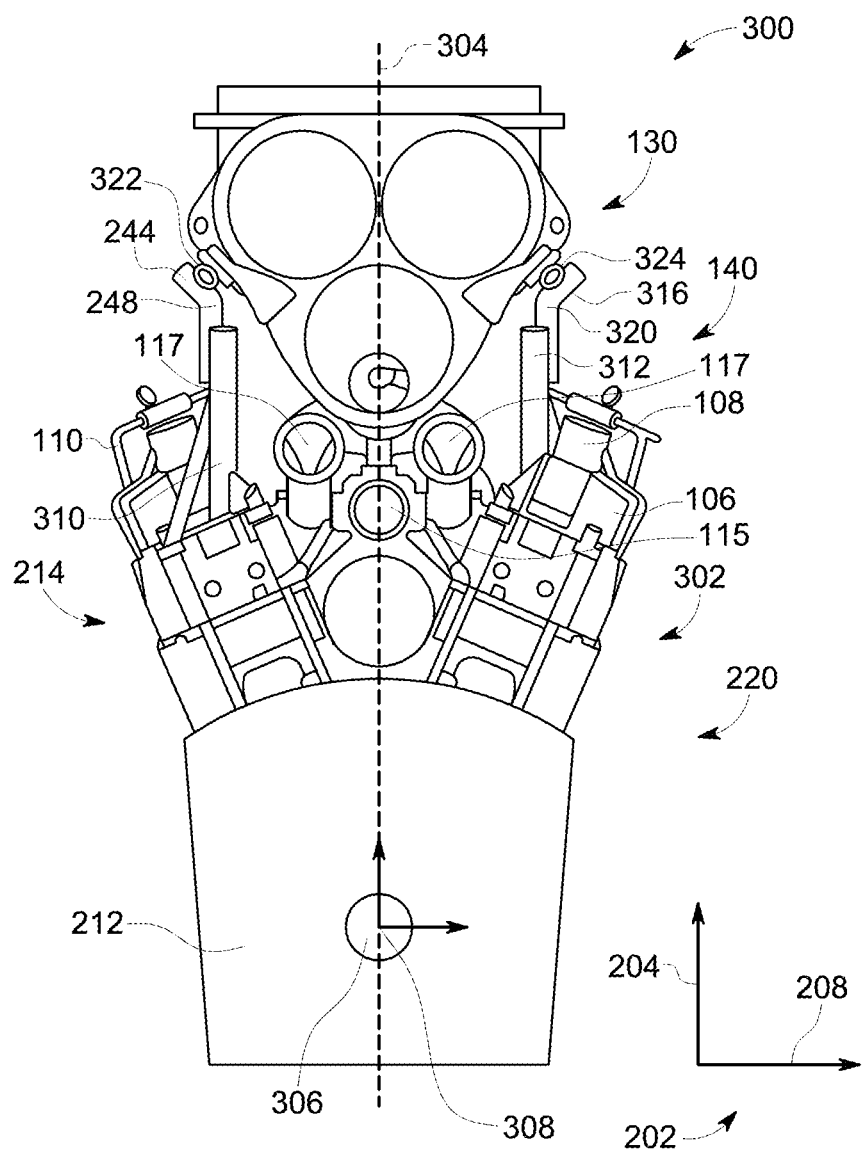

Engine 104 is a Vee engine (e.g., V-engine) having a first bank of cylinders and a second bank of cylinders (seen in FIG. 3). In the embodiment depicted in FIG. 1, the engine 104 is a V-12 engine having twelve cylinders. In other examples, the engine may be a V-6, V-8, V-10, or V-16 or any suitable V-engine configuration. The engine 104 includes an engine block and an engine head. The engine head includes a plurality of cylinder heads, each cylinder head 106 including a respective cylinder. Specifically, FIG. 1 shows six individual cylinder heads 106 for a first bank of the engine 104. The other six individual cylinder heads of the second bank are hidden in FIG. 1, as they are positioned behind the six cylinder heads of the first bank.

Each cylinder head 106 includes a valve cover 108. Additionally, each cylinder head 106 includes a fuel injector. Each fuel injector passes through a respective valve cover 108 and connects to a high pressure fuel line 110. The high pressure fuel line 110 runs along a length of the engine 104. Each cylinder head 106 is further coupled to the exhaust manifold 117. As such, exhaust gases produced during combustion exit the cylinder heads 106 through the exhaust manifold 117 and then flow to the exhaust passage 116. The exhaust passage 116 contains additional engine system components, including a turbine of a turbocharger 120 and an exhaust gas aftertreatment system 130, described further below.

The engine system 100 includes a turbocharger 120 that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown) which is at least partially driven by a turbine (not shown). While in this case a single turbocharger is included, the system may include multiple turbine and/or compressor stages.

The engine system 100 further includes an exhaust gas aftertreatment treatment system 130 coupled in the exhaust passage 116 in order to reduce regulated emissions. As depicted in FIG. 1, the aftertreatment system 130 is disposed downstream of the turbocharger 120. In other embodiments, an exhaust gas aftertreatment system may be additionally or alternatively disposed upstream of the turbocharger 120. The exhaust gas aftertreatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

Further, as shown in FIG. 1, the aftertreatment system 130 is positioned vertically above the engine 104, with respect to a surface on which the engine 104 sits. The aftertreatment system 130 sits on and is supported by a support structure 140. The support structure 140 is directly mounted to the engine head. Specifically, the support structure 140 includes a plurality of support legs 142. Each support leg 142 is mounted to a respective cylinder head 106. The support structure 140 also includes a plurality of platforms 144 (only one shown in FIG. 1) coupled to the support legs 142 on each cylinder bank. Further, the support structure 140 includes coil isolators 146 coupled between each platform 144 and a surface of the aftertreatment system 130. As described further below, the coil isolators 146 may isolate the aftertreatment system 130 from vibration generated and transmitted by the engine 104. Further details of the support structure 140 are described below with regard to FIGS. 2-7.

In one embodiment, the engine system 100 may include an engine cab (not shown in FIG. 1). In this embodiment, the aftertreatment system 130 may be disposed between a top of the engine 104 and a ceiling of the engine cab. As such, the support structure 140 may suspend the aftertreatment system 130 above the engine 104 and below the ceiling of the engine cab.

The support structure introduced in FIG. 1 and described further below has several advantages over previous aftertreatment support structures. Firstly, the support structure 140 shown in FIG. 1 supports the aftertreatment system through platforms. Thus, the aftertreatment system of FIG. 1 is mounted to the platforms of the support structure instead of mounted to a wall of an engine cab. Secondly, the support structure 140 is mounted to the engine head instead of the engine block. Supporting the aftertreatment system with platforms of a support structure mounted to an engine head increases stability of the support structure and aftertreatment system. Mounting the aftertreatment system to the engine head, through the platforms, may reduce translation of vibrations from the vehicle in which the engine is installed to the aftertreatment system. Additionally, mounting the support structure directly to the engine head may allow for an increased number of mounting points, thereby reducing a size of each mounting fixture (e.g., support leg) and increasing the stability of the support structure.

The support structure described above and further below is configurable to support a load. Further, the legs of the support structure are configurable to mount to a mounting surface. In the embodiment of an engine system, the load is the aftertreatment system and the mounting surface is the engine head. In alternate embodiments, the support structure may support a different type of system or load and the legs may be mounted to a different mounting surface. The use of the support structure to support an aftertreatment system of an engine system is shown in further detail at FIGS. 2-5.

Figure 2:
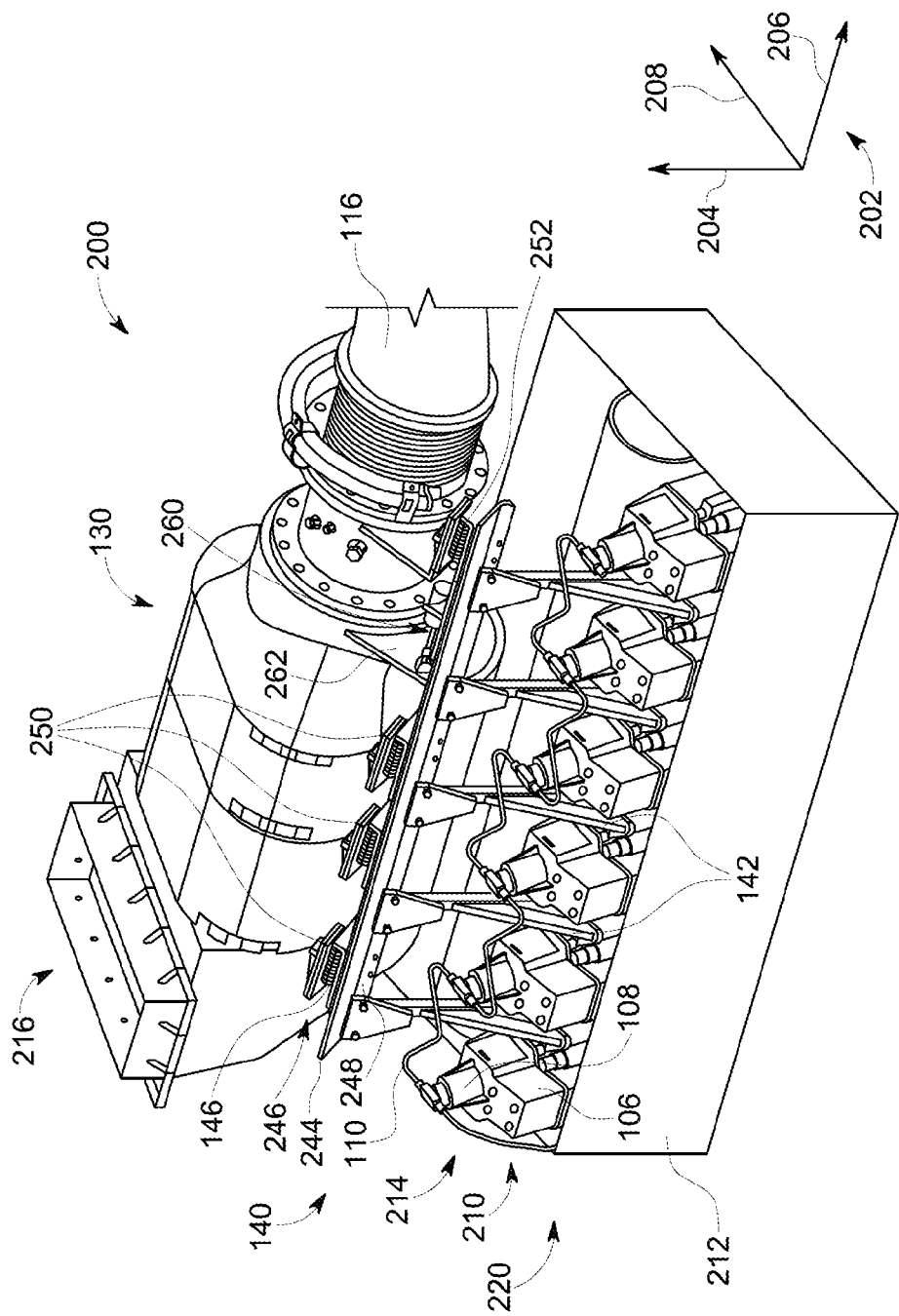
FIGS. 2-3 show a support structure of an aftertreatment system in an engine system according to an embodiment of the invention.

FIGS. 2-8 show a support structure 140 and its components. Specifically, FIGS. 2-3 show the support structure 140 installed in an engine system, such as the engine system 100 of FIG. 1. The engine system of FIGS. 2-3 may include like components to those described above with regard to FIG. 1.

Figure 4:
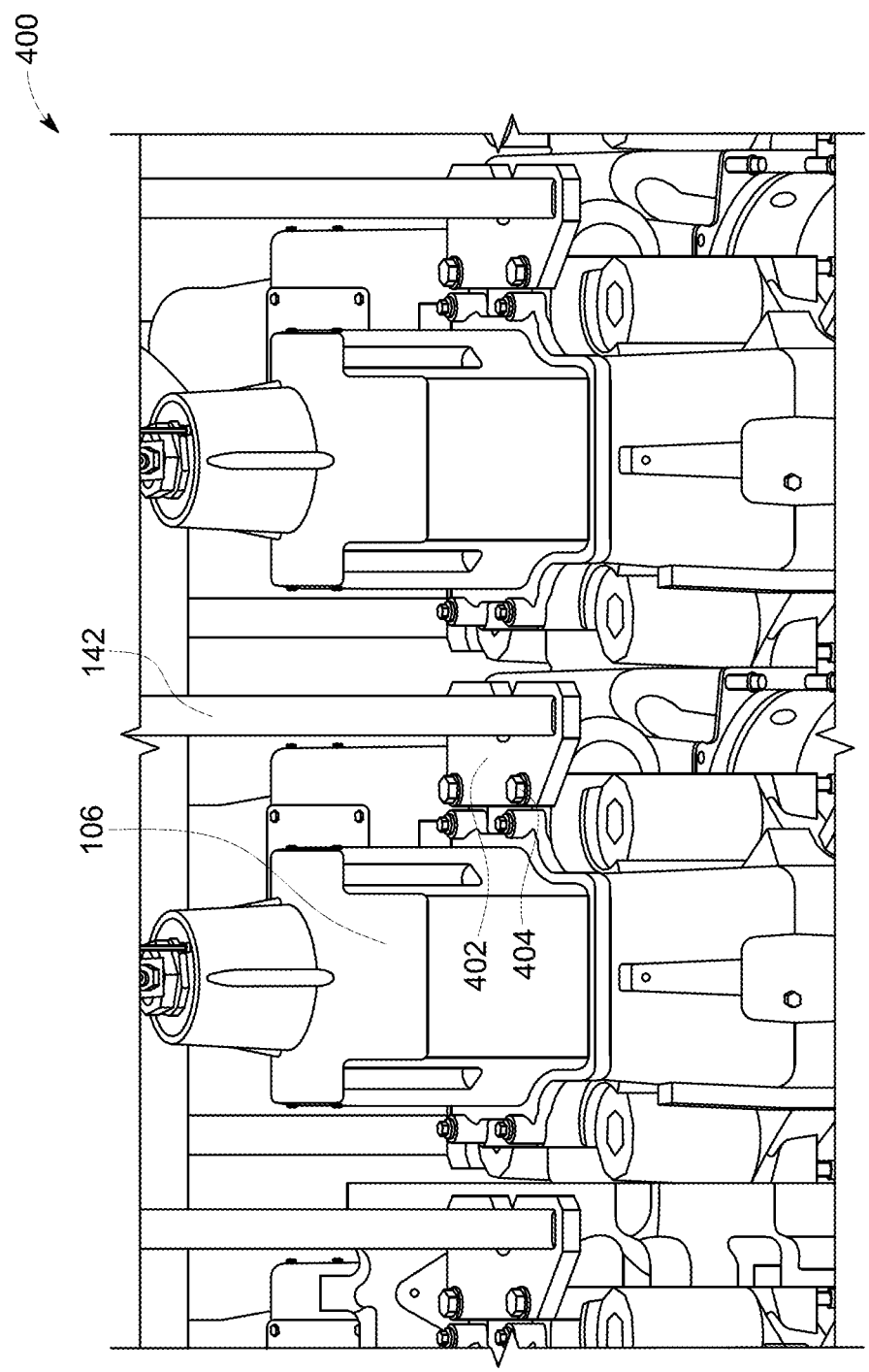
FIGS. 4-5 show a mounting interface between an aftertreatment system support structure and an engine head according to an embodiment of the invention.
Figure 5:
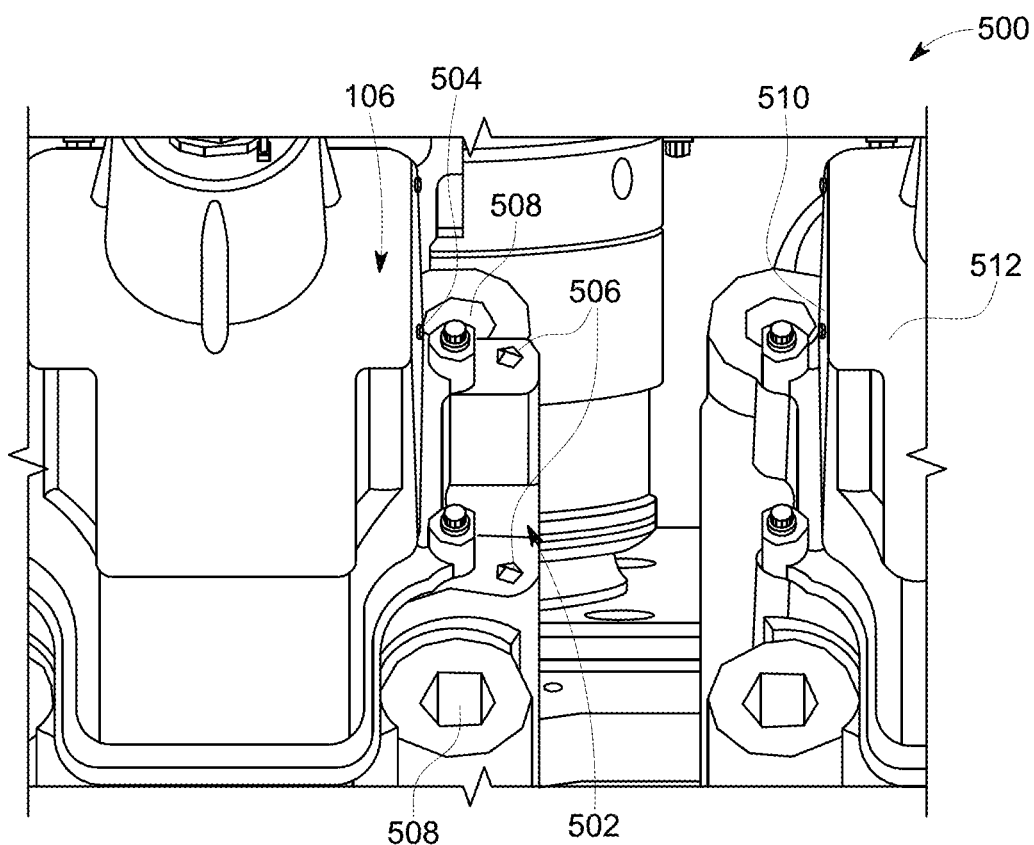
Figure 6:
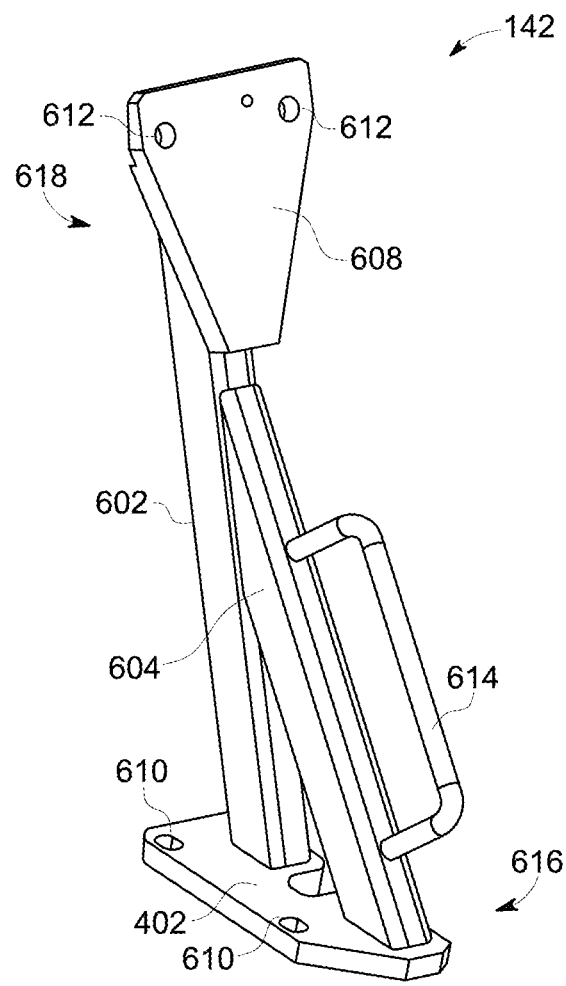
FIG. 6 shows a support leg of a support structure for an aftertreatment system according to an embodiment of the invention.
Figure 7:
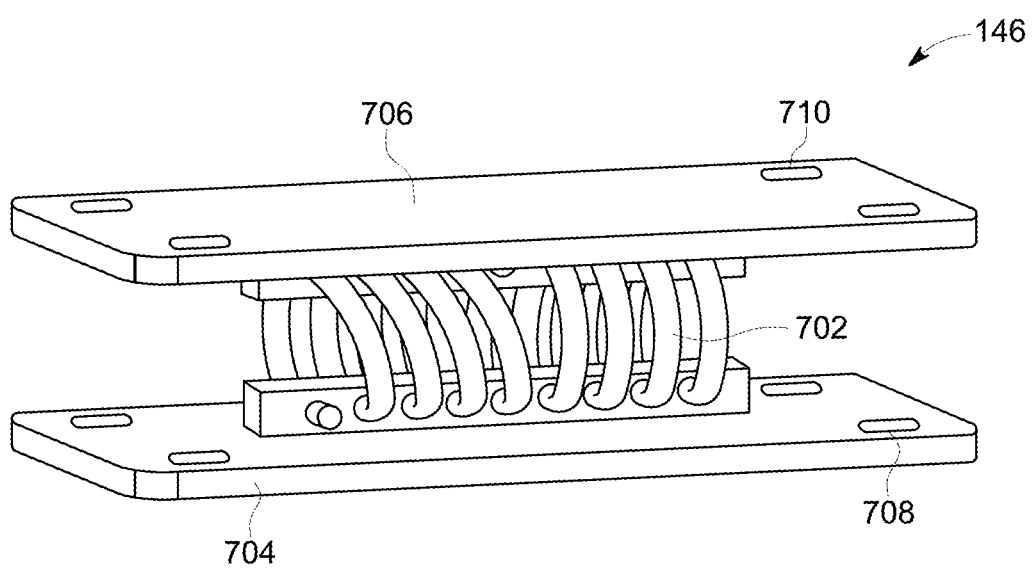
FIG. 7 shows a coil isolator of a support structure for an aftertreatment system according to an embodiment of the invention.
Figure 8:
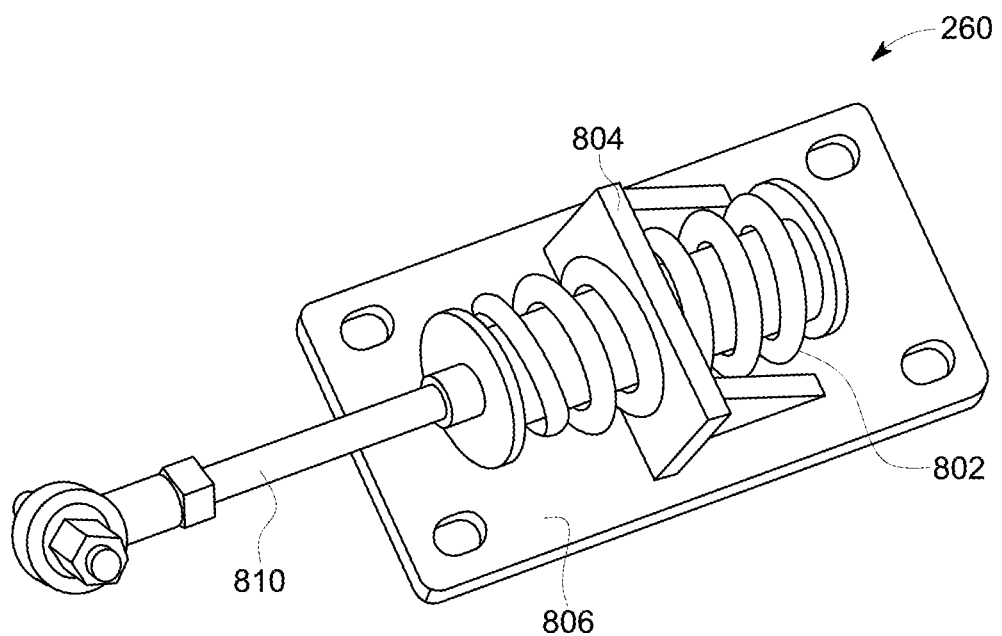
FIG. 8 shows a spring coil isolator of a support structure for an aftertreatment system according to an embodiment of the invention.

FIGS. 4-5 are detailed views of a mounting interface between the support structure 140 and an engine head. FIG. 6 shows a support leg of the support structure 140, FIG. 7 shows a coil isolator of the support structure 140, and FIG. 8 shows a spring coil isolator of the support structure 140.

Turning to FIGS. 2-3, a coordinate system 202 is shown, the coordinate system 202 having a vertical axis 204, a horizontal axis 206, and a lateral axis 208. FIG. 2 shows a schematic 200 of an isometric view of the support structure 140 in the engine system. FIG. 3 shows a schematic 300 of a cross-section view, in the vertical-lateral plane, of the support structure 140 in the engine system.

As shown in FIGS. 2-3, the support structure 140 is coupled to an engine head 210, the engine head 210 positioned on an engine block 212, of a V-engine 220 (such as engine 104 shown in FIG. 1). The engine head 210 includes a plurality of cylinder heads 106. Each cylinder head 106 includes an individual cylinder of the engine. As described above, the V-engine 220 includes a plurality of cylinder heads 106 aligned in two separate planes or banks, so that they appear to be in a "V" when viewed along the horizontal axis 206 (e.g., into the page in FIG. 3).

As shown in FIG. 2, the engine head 210 includes six cylinder heads 106 on a first bank 214 of the engine. The engine head 210 also includes six cylinder heads 106 on a second bank 302 of the V-engine 220 (hidden in FIG. 1). As shown in FIG. 3, the first bank 214 and the second bank 302 are opposite one another with respect to a vertical centerline 304 of the engine. The first bank 214 is to the left of the centerline 304 and the second bank 302 is to the right of the centerline 304. Thus, the first bank 214 may be referred to as the left bank and the second bank 302 may be referred to as the right bank. A crankshaft 306 of the V-engine 220 has an axis of rotation 308 in the direction of the horizontal axis 206 (e.g., into the page in FIG. 3). Further, the axis of rotation 308 of the crankshaft 306 is centered laterally at the centerline 304.

Each of the cylinder heads 106 are individually mounted to the engine block 212. As such, each cylinder head 106 is individually removable from the engine block 212. Additionally, as described above with regard to FIG. 1, each cylinder head 106 includes a valve cover 108. A high pressure fuel line 110 connects to a fuel injector of each cylinder head 106, the fuel injectors running through respective valve covers 108.

FIG. 3 also shows an intake manifold 115 and exhaust manifolds 117 of the V-engine 220. Intake air for combustion flows through the intake manifold 115 and enters each of the cylinder heads 106. Exhaust gases resulting from combustion exit the cylinder heads 106 and enter one of two exhaust manifolds. As shown in FIG. 3, the engine system includes one exhaust manifold for the first bank 214 of cylinders and one exhaust manifold for the second bank 302 of cylinders. Exhaust gases travel through the exhaust manifolds 117 and into an exhaust passage 116 (partially shown in FIG. 2). The exhaust passage 116 is coupled to the aftertreatment system 130. Exhaust gases flow through the aftertreatment system 130 and then exit the engine system through an exhaust stack 216 (shown in FIG. 2).

As introduced above in FIG. 1, the support structure 140 includes a plurality of support legs 142, a plurality of platforms (such as the platform 144 shown in FIG. 1), a plurality of coil isolators 146, and a plurality of rails. The support structure 140 may be divided into two sets of components, a first set on the first bank 214 of the engine and a second set on the second bank 302 of the engine. The first set of components on the first bank 214 is shown in FIG. 2.

As seen in FIG. 3, the centerline 304 of the V-engine 220 is also a centerline of the support structure 140. As such, the support structure is symmetric with respect to the centerline 304.

For example, the plurality of platforms includes a first platform 244 and a second platform 316. As shown in FIG. 3, the first platform 244 and the second platform 316 are on opposite sides of the centerline 304 from one another, with the first platform 244 to the left of the centerline (e.g., proximate to the first bank 214) and the second platform 316 to the right of the centerline (e.g., proximate to the second bank 302). The first platform 244 and the second platform 316 are angled at 45 degrees away from the centerline 304. Specifically, the degree of angling of the platforms forms an acute angle of 45 degrees, defined between the centerline 304 and a side of the platform facing the aftertreatment system 130. The degree of angling of the platforms also forms an obtuse angle of 135 degrees between the centerline 304 and a side of the platform facing the cylinder heads 106.

In alternate embodiments, the degree of angling (e.g., the acute angle) may be within a range of 0 to 90 degrees. For example, the range of angling of the platforms may be from 35 to 60 degrees. In one example, the degree of angling may be 60 degrees such that the first platform 244 and the second platform 316 are angled at 60 degrees away from the centerline 304. In another example, the degree of angling may be 40 degrees. In yet another example, the degree of angling may be greater than 0 degrees and less than 90 degrees such that the platforms are not completely vertical and not completely lateral, with respect to the vertical axis 204 and the lateral axis 208, respectively. The degree of angling may be based on a shape and size of the aftertreatment system 130. Further, the degree of angling may be defined such that the platforms support and cradle the aftertreatment system 130, thereby reducing additional assembly tooling for mounting the aftertreatment system 130 to the support structure 140.

The aftertreatment system 130 is positioned vertically above the V-engine 220 with respect to the vertical axis 204 and a surface on which a vehicle or other powered system in which the V-engine 220 is installed sits (such as the ground). The angling of the first platform 244 and the second platform 316 supports the aftertreatment system 130 both laterally and vertically, with regard to the lateral axis 208 and the vertical axis 204, respectively.

The plurality of coil isolators 146 includes a first set of coil isolators 246 and a second set of coil isolators. FIG. 3 shows a first coil isolator 322, the first coil isolator 322 included in the first set of coil isolators 246, coupled between the first platform 244 and a surface of a first side of the aftertreatment system 130. The first side of the aftertreatment system is on a first bank side of the V-engine 220, with respect to the centerline 304. Similarly, a second coil isolator 324, included in the second set of coil isolators, is coupled between the second platform 316 and a surface of a second side of the aftertreatment system 130. The second side of the aftertreatment system is on a second bank side of the V-engine 220, with respect to the centerline 304.

A rail is coupled to each platform. Specifically, as shown in FIG. 3, a first rail 248 is coupled to the first platform 244 and a second rail 320 is coupled to the second platform 316. Further, the first rail 248 and the second rail 320 are positioned parallel with a crankshaft of the engine. The first rail 248 and the second rail 320 are further coupled to the plurality of support legs 142.

The plurality of support legs 142 includes a first set of support legs on the first bank 214 and a second set of support legs on the second bank 302. FIG. 3 shows a first support leg 310 on the first bank 214, the first support leg 310 included in the first set of support legs, and a second support leg 312 on the second bank 302, the second support leg 312 included in the second set of support legs. As shown in FIG. 3, the first support leg 310 is coupled to the first rail 248 and the second support leg 312 is coupled to the second rail 320. The first support leg 310 is further coupled to a cylinder head 106 on the first bank 214 and the second support leg 312 is further coupled to a cylinder head 106 on the second bank 302. Further details on the mounting of the support structure 140 to the engine head 210 and the aftertreatment system 130 are shown in FIG. 2.

Turning to FIG. 2, a first side of the support structure, on the first bank 214, is shown. Specifically, FIG. 2 shows five support legs 142 included in the first set of support legs. The second set of support legs (not shown in FIG. 2) also includes five support legs 142. In alternate embodiments, the support structure 140 may have more or less than ten total support legs. In one embodiment, the number of support legs is based on a number of cylinder heads. For example, in an embodiment wherein the V-engine 220 includes four cylinder heads 106 on each bank, the support structure 140 may include three support legs on each bank (e.g., six support legs in total). However, in other embodiments, the number of support legs may be based on other factors, such as a mass of the load placed on the support structure and/or a size of the support legs.

A first end of each support leg 142 in the first set of support legs is coupled to a respective cylinder head 106 on the first bank 214. Similarly, a first end of each support leg 142 in the second set of support legs is coupled to a respective cylinder head 106 on the second bank 302. Each support leg 142 is coupled to a side of a respective cylinder head 106 such that each support leg 142 is positioned between adjacent cylinder heads 106.

FIGS. 4-5 show a mounting interface between the support legs 142 and cylinder heads 106 in detail. FIG. 4 is a schematic 400 showing the first end of each support leg 142 mounted to the side of a respective cylinder head 106. FIG. 5 is a schematic 500 showing a mounting bracket 502 of the cylinder head 106. The mounting bracket 502 is coupled to a side 504 of the cylinder head 106. The mounting bracket 502 includes holes 506 configurable to receive fasteners for fastening the support leg 142 to the mounting bracket 502. Further, the mounting bracket 502 is positioned between holes 508. The holes 508 are holes configurable to receive fasteners, such as bolts, for fastening the cylinder head 106 to the engine block 212. As discussed above, each cylinder head 106 is individually mounted through the holes 508 to the engine block 212. The mounting bracket 502 is positioned proximate to an opposite side 510 of an adjacent cylinder head 512. Additionally, as shown in FIG. 4, each support leg 142 is mounted on the same side (e.g., side 504 shown in FIG. 5) of each cylinder head 106. As such, each mounting bracket is coupled to the same side of each cylinder head 106.

As shown in FIG. 4, a base 402 of the support leg 142 is coupled to the mounting bracket. Bolts 404, or another type of fastener, fix the base 402 to the mounting bracket 502 at the holes 506 (shown in FIG. 5). As shown in FIGS. 4-5, the mounting bracket 502 includes two holes 506, or fastening points, for mounting the support leg 142 to the cylinder head 106. In alternate embodiments, the mounting bracket 502 may include more or less than two fastening points. For example, the mounting bracket 502 may include only one hole 506 and only one bolt 404 may fix the base 402 to the mounting bracket 502. In another example, the mounting bracket may include three or more holes 506 and three or more bolts 404 may fix the base 402 of the support leg 142 to the mounting bracket 502. The support leg 142 is shown in more detail at FIG. 6.

FIG. 6 shows an isometric view of a single support leg 142 of the support structure 140. The support leg 142 includes a first end 616 and a second end 618. As described above, the first end 616 of the support leg 142 is coupled to a respective cylinder head. As described further below, the second end 618 of the support leg 142 is coupled to a rail of the support structure 140, the rail coupled to a platform.

The support leg 142 includes a first segment 602 and a second segment 604. The first segment 602 is coupled to the base 402 and a mounting face 608. The base 402 is configurable to mount to a mounting surface. Specifically, the base 402 is flat and includes holes 610 for fastening or mounting the support leg 142 to a mounting surface. In the embodiments shown in FIGS. 2-5, the mounting surface is a mounting bracket of a cylinder head 106. As described above with regard to FIGS. 4-5, the base 402 is coupled to the mounting bracket 502 on the side of the cylinder head 106. Specifically, the bolts 404 pass through the holes 610 in the base 402 and the corresponding holes 506 in the mounting bracket 502 to fasten the base 402 to the mounting bracket 502. As described above, in alternate embodiments, the base 402 may include more or less holes 610 than two, as shown. In an embodiment, the number of holes 610 is equal to the number of holes 506. Further, the mounting face 608 of the support leg 142 is flat with a triangular shape. The mounting face 608 includes holes 612 for fastening or mounting the support leg 142 to one of the first rail 248 or the second rail 320.

The second segment 604 is coupled to the base 402 and the first segment 602. Specifically, a first end of the second segment 604 is coupled to the first segment 602 at a middle portion of the first segment 602 (e.g., between the base 402 and the mounting face 608). A second end of the second segment 604 is coupled to the base 402. Further, a handle 614 is coupled to the second segment 604. The handle 614 may facilitate removal of the individual support leg 142 from its corresponding cylinder head 106 and from the rest of the support structure 140. In an alternate embodiment, the support leg 142 may not include a handle 614. In this case, the support leg 142 may still be individually removable from the support structure 140 and its respective cylinder head 106.

Returning to FIG. 2, a second end of each support leg 142 is coupled to a rail. For example, as shown in FIG. 2, a second end of each support leg 142 of the first set of support legs is coupled to the first rail 248. The first rail 248 is coupled to a first side of the first platform 244. The first side of the first platform 244 is a downward-facing side which faces the engine head 210. Further, a first side of each coil isolator 146 in the first set of coil isolators 246 is coupled to a second side of the first platform 244. The second side of the first platform 244 is an upward-facing side which faces the aftertreatment system 130. A second side of each coil isolator 146 in the first set of coil isolators 246 is coupled to a surface of the aftertreatment system 130.

As shown in FIG. 2, the first platform 244 on the first bank 214 extends along a length of the engine block 212. Similarly, the second platform 316 on the second bank 302 (not shown in FIG. 2) also extends along the length of the engine block 212. A length of the first platform 244 and the second platform 316 is shorter than the length of the engine block 212. In alternate examples, the length of the first platform 244 and the second platform 316 may be the same length as the engine block 212.

Further, FIG. 2 shows four coil isolators 146 included in the first set of coil isolators 246. The second set of coil isolators (not shown in FIG. 2) also includes four coil isolators 146 on the opposite side of the V-engine 220 (e.g., second side proximate to the second bank 302). The second set of coil isolators may be positioned similarly on the second platform 316 as the first set of coil isolators 246 on the first platform 244, as described below.

Each coil isolator 146 is positioned a distance away from an adjacent coil isolator 146, along a length of the first platform 244. The distance between adjacent coil isolators 146 is not the same for all the coil isolators 146. For example, as shown in FIG. 2, three coil isolators 250 of the first set of coil isolators 246 are coupled to a main body of the aftertreatment system 130. A fourth coil isolator 252 of the first set of coil isolators 246 is coupled to the aftertreatment system 130 at a junction between the aftertreatment system 130 and the exhaust passage 116. As such, the three coil isolators 250 are positioned along the first platform 244, closer to the exhaust stack 216 than the fourth coil isolator 252. Similarly, the fourth coil isolator 252 is positioned along the first platform 244, closer to the exhaust passage 116 than the three coil isolators 150.

In alternate embodiments, the support structure 140 may have more or less than eight total coil isolators 146. The number of coil isolators may be based on a size and/or length of the aftertreatment system 130. For example, an aftertreatment system 130 with a longer length may include more coil isolators 146 on each side of the aftertreatment system than an aftertreatment system with a shorter length. Further, the number of coil isolators 146 may be based on the degree of angling of the first platform 244 and the second platform 316. For example, angling the first platform 244 and the second platform 316 at 45 degrees allows the coil isolators 146 to be effective in both the vertical plane (defined with respect to the vertical axis 204) and the lateral plane (defined with respect to the lateral axis 208. Thus, the number of coil isolators 146 may be fewer when the platforms are angled at 45 degrees than if the platforms were angled at an angle greater or less than 45 degrees. In an alternate example, because the coil isolators may have different vertical and lateral stiffness, the angle allowing for the fewest coil isolators may be less than 45 degrees.

FIG. 7 shows a single coil isolator 146 in further detail. The coil isolator 146 includes an elastic coil 702 positioned between a first plate 704 and a second plate 706. The first plate 704 is mounted to one of the first platform 244 or the second platform 316. For example, fasteners may pass through holes 708 on the first plate 704 to fix the first plate 704 of the coil isolator 146 to one of the first platform 244 or the second platform 316. The second plate 706 is configured to receive a load. In the embodiments shown in FIGS. 2-3, the load is the aftertreatment system 130. In this embodiment, fasteners may pass through holes 710 on the second plate 706 to mount the second plate 706 to the surface of the aftertreatment system 130.

The coil isolator 146 may dampen vibrations transmitted by the V-engine 220. For example, if the V-engine 220 is installed in a vehicle, the coil isolator 146 may resist and dampen lateral and vertical movement of the vehicle. The lateral and vertical movements are defined with respect to the lateral axis 208 and the vertical axis 204, respectively. During engine and/or vehicle operation, the elastic coil 702 may compress and/or stretch to reduce the translation of vibrations from the first plate 704 to the second plate 706. In this way, the coil isolators 146 may isolate the aftertreatment system 130 from movement and vibration translated through the engine block 212.

Returning to FIG. 2, the support structure 140 further includes a spring coil isolator on each side of the support structure 140. The spring coil isolator is a type of coil isolator. As such, the coil isolators 146 described above may be referred to as coiled coil isolators which have a different structure than the spring coil isolators shown in FIG. 8.

As shown in FIG. 2, a first spring coil isolator 260 is positioned on the first platform 244 between the three coil isolators 250 and the fourth coil isolator 252. FIG. 8 shows a single spring coil isolator 260 in further detail. The spring coil isolator 260 includes a spring 802 mounted in a spring bracket 804. The spring bracket 804 is coupled to a plate 806. Further, the spring 802 is coupled between the spring bracket 804 and an arm 810. The spring 802 may resist movement between the plate 806 and the arm 810.

As shown in FIG. 2, the plate 806 of the first spring coil isolator 260 is coupled to the first platform 244 and the arm 810 of the first spring coil isolator 260 is coupled to a protruding wall 262 of the aftertreatment system 130. In this configuration, the spring coil isolator resists horizontal movement, defined with respect to the horizontal axis 206, translated by the V-engine 220. In this way, the spring coil isolator may dampen vibrations and/or movement in the horizontal direction, thereby isolating the aftertreatment system 130 from the horizontal movement.

In an alternate embodiment, the support structure 140 may not include any spring coil isolators. In yet another embodiment, the support structure 140 may include more than one spring coil isolator on each side of the support structure 140. Additionally, in some embodiments, the spring coil isolator may be positioned at a different location along the first platform 244. For example, the protruding wall 262 may be positioned at a different location along the aftertreatment system 130 (e.g., closer to the exhaust passage 116 or closer to the exhaust stack 216). As such, the position of the spring coil isolator may change along with the altered position of the protruding wall 262.

FIGS. 2-8 show a non-limiting embodiment of the support structure 140 for the aftertreatment system 130 of the V-engine 220. As described above, in alternate embodiments, the engine head 210 may include more or less than six cylinder heads 106 on each bank of the V-engine 220. As a result, the support structure 140 may include more or less than five support legs 142 on each side of the support structure 140, the sides of the support structure 140 corresponding to the sides or banks of the V-engine 220. Further, the support structure 140 may include any combination of isolators coupled to the platforms, the isolators including the coil isolators and the spring coil isolators. For example, the support structure 140 may include more or less than four coil isolators and/or more or less than one spring coil isolator on each side of the support structure 140.

In this way, a support structure for an exhaust gas aftertreatment system of an engine system may be coupled directly to an engine head of a V-engine. Specifically, the support structure may include a plurality of support legs individually mounted to a respective cylinder head of the engine head. Further, each cylinder head may be individually mounted to an engine block of the V-engine. The support structure may also include a rail coupled to support legs on each bank of the V-engine. Each rail may include a plurality of isolators which resist engine vibrations. The aftertreatment system may be coupled to the coil isolators and supported vertically above the V-engine by the support structure. In this way, the aftertreatment system may be supported along a length of the V-engine and isolated from engine vibrations. Further, individually mounting the support legs to respective cylinder heads creates a modular support structure and engine head, thereby allowing individual engine heads to be serviced without removing the entire support structure and aftertreatment system from the engine.

As one embodiment, a system comprises a support structure including a plurality of support legs, a first end of each support leg of the plurality of support legs coupleable to a respective cylinder head of the plurality of cylinder heads mountable to an engine block, the plurality of support legs configurable to support an exhaust aftertreatment system. The system further includes the engine block, the engine block configured for a V-engine and having a first bank and a second bank, wherein the support structure is centered along a centerline of the V-engine.

The support structure further includes a first platform and a second platform positioned on opposite sides of the centerline from one another, the first platform and the second platform extending along a length of the engine block. Additionally, a first rail is coupled to a first side of the first platform and a second rail is coupled to a first side of the second platform, the first rail and the second rail positioned parallel with a crankshaft of the engine. A second end of each support leg of the plurality of support legs is coupled to one of the first rail or the second rail.

The first platform and the second platform are angled at 45 degrees away from the centerline. The exhaust aftertreatment system is positioned vertically above the V-engine, with respect to a ground on which a vehicle or other powered system in which the V-engine is installed sits, and positioned against the first platform and the second platform through a plurality of coil isolators. A first side of each coil isolator of the plurality of coil isolators is coupled to a second side of one of the first platform and the second platform and a second side of each coil isolator of the plurality of coil isolators is coupled to a surface of the exhaust aftertreatment system.

Each support leg of the support structure is individually mounted to and removable from a mounting bracket coupled to a side of the respective cylinder head. Further, each cylinder head of the plurality of cylinder heads is a single cylinder head separately mounted to the engine block. In this way, each support leg may be individually removed in order to service a selected cylinder head without removing the entire support structure.

As another embodiment, a support structure comprises a first platform angled away from a centerline of the support structure, a second platform positioned opposite the first platform with respect to the centerline, the second platform angled away from the centerline, a first set of support legs, an end of each support leg of the first set of support legs coupled to the first platform, a second set of support legs, an end of each support leg of the second set of support legs coupled to the second platform, a first set of coil isolators coupled to the first platform, and a second set of coil isolators coupled to the second platform. The first set of coil isolators and the second set of coil isolators are configurable to receive a load. In one example, the load may be an exhaust gas aftertreatment system of an engine system. Further, each coil isolator of the first set of coil isolators and the second set of coil isolators includes an elastic coil positioned between a first plate and a second plate, the first plate mounted to one of the first platform and the second platform and the second plate configured to receive the load. Coil isolators of the first set of coil isolators are positioned a distance away from one another, along a first length of the first platform, and coil isolators of the second set of coil isolators are positioned the distance away from one another, along a second length of the second platform, the second length the same as the first length.

The first platform of the support structure is positioned a distance from the centerline and the second platform of the support structure is positioned the distance from the centerline on an opposite side of the centerline. Further, each support leg of the first set of support legs and the second set of support legs includes a first segment, a base, a mounting face, and a second segment, the first segment coupled to the base, the base configurable to mount to a mounting surface, the mounting face coupled to one of a first rail and a second rail, the first rail coupled to the first platform and the second rail coupled to the second platform, and the second segment coupled to the base and the first segment. Additionally, each support leg further includes a handle coupled to the second segment and wherein each support leg is individually removable from the support structure.

As yet another embodiment, a support structure for an aftertreatment system of a V-engine comprises a first set of support legs, each support leg of the first set of support legs having a first end and a second end, and a second set of support legs, each support leg of the second set of support legs having a first end and a second end. The support structure further includes a first platform coupled to the second end of each support leg of the first set of support legs, a second platform coupled to the second end each support leg of the second set of support legs, a first set of coil isolators coupled between the first platform and a first side of the aftertreatment system, and a second set of coil isolators coupled between the second platform and a second side of the aftertreatment system, the second side of the aftertreatment system opposite the first side with respect to a centerline of the V-engine.

The first end of each support leg of the first set of support legs is removably mounted to a respective cylinder head of a first bank of cylinders and the first end of each support leg of the second set of support legs is removably mounted to a respective cylinder head of a second bank of cylinders, the second bank opposite the first bank with respect to the centerline of the V-engine. The second end of each support leg of the first set of support legs is coupled to the first platform through a first rail and the second end of each support leg of the second set of support legs is coupled to the second platform through a second rail. Further, the first platform and the second platform are angled away from the centerline of the V-engine at an angle of 45 degrees from the centerline.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   an engine block configured for a V-engine and having a first bank and a second bank;
   a plurality of cylinder heads mountable to the engine block; and
   a support structure including a plurality of support legs, a first end of each support leg of the plurality of support legs coupleable to a respective cylinder head of the plurality of cylinder heads, the plurality of support legs configurable to support an exhaust aftertreatment system, the support structure centered along a centerline of the V-engine.

2. The system of claim 1, wherein each cylinder head of the plurality of cylinder heads is a single cylinder head separately mounted to the engine block.

3. The system of claim 1, wherein the support structure includes a first platform and a second platform positioned on opposite sides of the centerline from one another, the first platform and the second platform extending along a length of the engine block.

4. The system of claim 3, wherein a first rail is coupled to a first side of the first platform and a second rail is coupled to a first side of the second platform, the first rail and the second rail positioned parallel with a crankshaft of the V-engine.

5. The system of claim 4, wherein a second end of each support leg of the plurality of support legs is coupled to one of the first rail or the second rail.

6. The system of claim 3, wherein the first platform and the second platform are angled at 45 degrees away from the centerline.

7. The system of claim 6, wherein the exhaust aftertreatment system is positioned vertically above the V-engine, with respect to a ground on which a vehicle or other powered system in which the V-engine is installed sits, and positioned against the first platform and the second platform through a plurality of coil isolators.

8. The system of claim 7, wherein a first side of each coil isolator of the plurality of coil isolators is coupled to a second side of one of the first platform and the second platform and a second side of each coil isolator of the plurality of coil isolators is coupled to a surface of the exhaust aftertreatment system.

9. The system of claim 1, wherein each support leg is individually mounted to and removable from a mounting bracket coupled to a side of the respective cylinder head.

10. A support structure, comprising:
    a first platform angled away from a centerline of the support structure;
    a second platform positioned opposite the first platform with respect to the centerline, the second platform angled away from the centerline;
    a first set of support legs, an end of each support leg of the first set of support legs coupled to the first platform;
    a second set of support legs, an end of each support leg of the second set of support legs coupled to the second platform;
    a first set of coil isolators coupled to the first platform; and
    a second set of coil isolators coupled to the second platform.

11. The support structure of claim 10, wherein the first set of coil isolators and the second set of coil isolators are configurable to receive a load and wherein each coil isolator of the first set of coil isolators and the second set of coil isolators includes an elastic coil positioned between a first plate and a second plate, the first plate mounted to one of the first platform and the second platform and the second plate configured to receive the load.

12. The support structure of claim 11, wherein coil isolators of the first set of coil isolators are positioned a distance away from one another, along a first length of the first platform, and coil isolators of the second set of coil isolators are positioned the distance away from one another, along a second length of the second platform, the second length the same as the first length.

13. The support structure of claim 10, wherein the first platform is positioned a distance from the centerline and the second platform is positioned the distance from the centerline on an opposite side of the centerline from the first platform.

14. The support structure of claim 10, wherein each support leg of the first set of support legs and the second set of support legs includes a first segment, a base, a mounting face, and a second segment, the first segment coupled to the base, the base configurable to mount to a mounting surface, the mounting face coupled to one of a first rail and a second rail, the first rail coupled to the first platform and the second rail coupled to the second platform, and the second segment coupled to the base and the first segment.

15. The support structure of claim 14, wherein each support leg further includes a handle coupled to the second segment and wherein each support leg is individually removable from the support structure.

16. A support structure for an aftertreatment system of a V-engine, comprising:
    a first set of support legs, each support leg of the first set of support legs having a first end and a second end;
    a second set of support legs, each support leg of the second set of support legs having a first end and a second end;
    a first platform coupled to the second end of each support leg of the first set of support legs;
    a second platform coupled to the second end each support leg of the second set of support legs;
    a first set of coil isolators coupled between the first platform and a first side of the aftertreatment system; and
    a second set of coil isolators coupled between the second platform and a second side of the aftertreatment system, the second side of the aftertreatment system opposite the first side with respect to a centerline of the V-engine.

17. The support structure of claim 16, wherein the first end of each support leg of the first set of support legs is removably mounted to a respective cylinder head of a first bank of cylinders and the first end of each support leg of the second set of support legs is removably mounted to a respective cylinder head of a second bank of cylinders, the second bank opposite the first bank with respect to the centerline of the V-engine.

18. The support structure of claim 16, wherein the second end of each support leg of the first set of support legs is coupled to the first platform through a first rail and the second end of each support leg of the second set of support legs is coupled to the second platform through a second rail.

19. The support structure of claim 16, wherein the first platform and the second platform are angled away from the centerline of the V-engine at an angle of 45 degrees from the centerline.

* * * * *